United States Patent [19]
Miida et al.

[11] Patent Number: 5,777,675
[45] Date of Patent: Jul. 7, 1998

[54] AUTOMATIC LIGHT MEASURING DEVICE FOR IMAGE PICKUP DEVICE

[75] Inventors: Takashi Miida; Kazuhiro Kawajiri; Jun Hasegawa; Isao Taniguchi, all of Miyagi-ken, Japan

[73] Assignee: Fuji Photo Film Co., Ltd., Kanagawa, Japan

[21] Appl. No.: 988,334

[22] Filed: Dec. 9, 1992

[30] Foreign Application Priority Data

Dec. 10, 1991  [JP]  Japan .................... 3-326201

[51] Int. Cl.$^6$ ..................... H04N 5/232; H04N 5/335
[52] U.S. Cl. ................. 348/350; 348/221; 348/227
[58] Field of Search ......................... 358/227, 213.9; 354/402; 257/24; 348/221, 345, 350, 230

[56] References Cited

U.S. PATENT DOCUMENTS

| | | | |
|---|---|---|---|
| 4,065,777 | 12/1977 | Maitani et al. | 354/480 |
| 4,169,231 | 9/1979 | Nash et al. | 257/24 |
| 4,479,062 | 10/1984 | Kawasaki et al. | 354/402 |
| 5,241,167 | 8/1993 | Suzuki et al. | 354/402 |

*Primary Examiner*—Andrew Faile
*Assistant Examiner*—Andrew B. Christensen
*Attorney, Agent, or Firm*—Sughrue, Mion, Zinn, Macpeak & Seas, PLLC

[57] ABSTRACT

An automatic light measuring device for an image pickup device includes a pair of line sensors suitable for an automatic focusing adjustment and disposed on a semiconductor chip at positions spaced apart by a predetermined distances, an integration time controller for generating an integration control signal for controlling the charge accumulation by incident light by detecting the amount of charges accumulated in the line sensors, a first exposure amount detector for calculating the intensity of incident light from the integration control signal, a second exposure amount detector inclusive of photoelectric conversion elements formed on the semiconductor chip, for detecting the amount of incident light, a pair of lenses mounted above the pair of line sensors for focusing the image of substantially the same subject within the central area of the field of view, and an optical system for applying light within the area broader than the central area of the field of view to the surface of the semiconductor chip inclusive of the photoelectric conversion elements. The photoelectric conversion elements are disposed between the pair of line sensors. The optical system may be made of an acrylic rod, light focusing fibers, retrofocus lens, or the like.

15 Claims, 8 Drawing Sheets

AUTOMATIC LIGHT MEASURING DEVICE FOR IMAGE PICKUP DEVICE

BACKGROUND OF THE INVENTION a) Field of the Invention

The present invention relates to an automatic light measuring device for an image pickup device, and more particularly to an automatic light measuring device for an image pickup device provided with an automatic focusing function and an automatic exposure adjusting function.

b) Description of the Related Art

It is necessary for an image pickup device to focus a main subject and to control exposure. In an automatic image pickup device, electronic devices automatically perform focusing and exposure adjustment.

For automatic focusing control, the image of a subject is focused on a pair of line sensors, for example, and the distance to the subject is estimated from a phase difference between the two images focused on the line sensors. In this case, unless the integrated value of light applied to the line sensors is proper, a S/N ratio may be degraded or the image may have blank areas. In view of this, the charge integration time is controlled by using an automatic gain control (AGC) circuit for detecting an accumulated charge amount.

If a charge integration time necessary for accumulating sufficient charge amount is known, the illuminance on the line sensor can be determined from the integration time. It is therefore possible to obtain data used for automatic exposure adjustment while performing automatic focusing adjustment.

In the automatic focusing adjustment, only the central area of a subject within a field of view is focused in order to obtain a sharp contrast. Therefore, if the illuminance of the central area of a main subject within the field of view is greatly different from that of the background, the automatic exposure adjustment using the data obtained while performing the automatic focusing adjustment does not consider the illuminance of the background. This becomes a serious problem particularly for daylight synchro-flash image taking or slow synchro-flash image taking.

Also known is an image pickup device having a sensor dedicated to automatic exposure adjustment. Measurement of illumination for the automatic exposure adjustment is carried out for almost the whole area of the field of view.

In this case, with the exposure adjustment for the whole area of a field of view, proper exposure information of a main subject cannot be obtained if a main subject receives rear light, resulting in a frame image with a dark main subject positioned within a bright background.

It is necessary to perform a finer automatic exposure adjustment in order to eliminate such disadvantages. Although it is conceivable to provide several exposure detecting areas within a field of view, the control of the whole system becomes complicated.

SUMMARY OF THE INVENTION

It is an object of the present invention to provide an automatic light measuring device for an image pickup device capable of performing a finer automatic exposure adjustment with a simple structure.

According to one aspect of the present invention, there is provided an automatic light measuring device for an image pickup device comprising: a pair of line sensors suitable for performing an automatic focusing adjustment, the pair of line sensors being spaced apart by a predetermined distance and mounted on a single semiconductor chip; integration time controlling means for generating an integration control signal for controlling charge accumulation by incident light, by detecting the amount of charges accumulated on the line sensors; first exposure amount detecting means for calculating the intensity of the incident light from the integration control signal; second exposure amount detecting means; second exposure amount detecting means inclusive of photoelectric conversion elements formed on the semiconductor chip, for detecting the amount of incident light; a pair of lenses mounted above the pair of line sensors for focusing the image of substantially the same subject within the central area of the field of view; and an optical system for applying light within the broader area than the central area of the field of view to the surface of the semiconductor chip.

If the automatic exposure adjustment is performed using data obtained by an automatic focusing sensor, there is formed a frame image neglecting the background except the main subject. Furthermore, if a dedicated exposure sensor or sensors are used, a frame image with a main subject of improper exposure may be formed under rear light, or the control for exposure adjustment may become complicated.

By using a pair of line sensors, the automatic focusing adjustment for a main subject within the central area of the field of view is performed, and also the exposure data is obtained. By using the photoelectric conversion elements formed on the same semiconductor chip, the exposure data for the whole area of the field of view inclusive of the background is obtained.

Use of both the exposure data provides finer exposure information.

For example, use of the exposure data for the main subject and the exposure data for the whole area of the field of view allows daylight synchro-flash image taking and slow synchro-flash image taking, and also provides a proper exposure amount for a main subject in rear light.

Since various exposure amounts can be measured by using a single semiconductor chip, a finer exposure amount control is possible.

Furthermore, the AE and AF sensors are formed on the same semiconductor chip and incident light to both the AE and AF sensors passes through the same filter, so that an incident light detecting signal having the same characteristic can be obtained.

DETAILED DESCRIPTION OF THE PREFERRED EMBODIMENTS

Figure 1A:
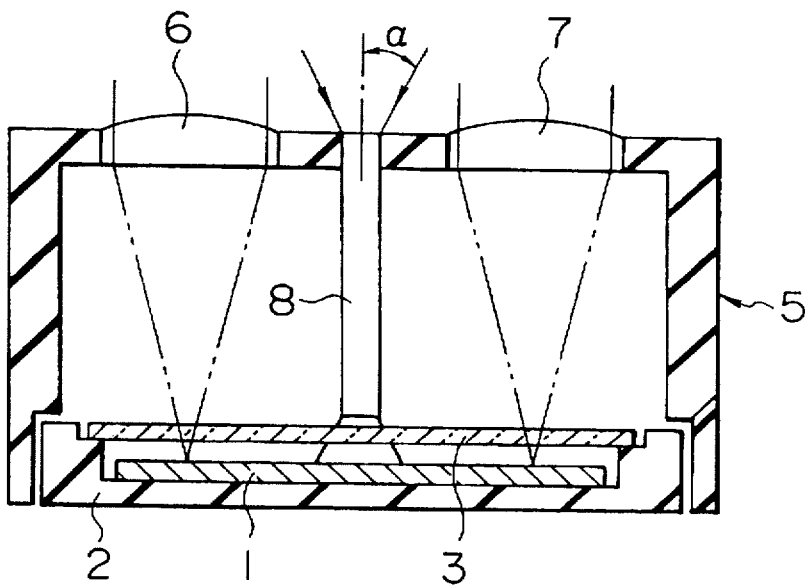
FIGS. 1A to 1C show an automatic light measuring device for an image pickup device according to an embodiment of the present invention.
Figure 1B:
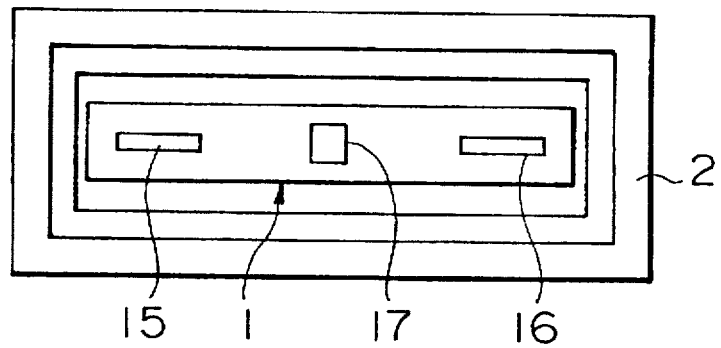
Figure 1C:
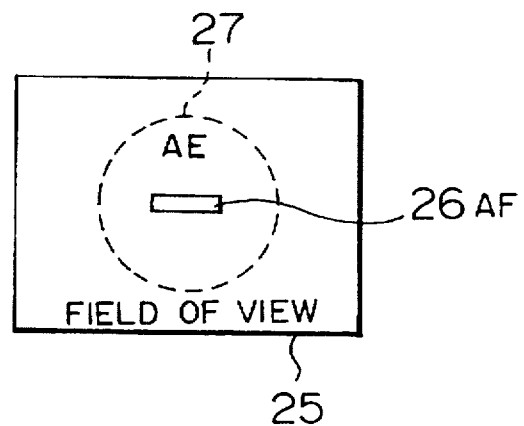

FIGS. 1A to 1C show an automatic light measuring device for an image pickup device according to an embodiment of the present invention. FIG. 1A is a schematic cross section of the device, FIG. 1B is a schematic plan view showing the layout of a semiconductor chip, and FIG. 1C shows the layout within a field of view.

As shown in FIG. 1A, a semiconductor chip 1 is mounted on a package base 2 which is sealed by a sealing glass 3 at its top surface. The sealing glass 3 is formed with an infrared ray cut-filter. An optical module 5 is mounted on the package made of the package base 2 and sealing glass 3. A pair of automatic focusing (AF) lenses 6 and 7 are disposed on the top surface of the optical module 5, the lenses focusing the image of a main subject onto a pair of areas on the semiconductor chip 1.

An acrylic rod member 8 serving as an automatic exposure (AE) adjustment member is coupled to the optical module 5 at the center thereof. The acrylic rod member 8 extends downward near the upper surface of the semiconductor chip 1. External light having an incident angle α or less determined by the refractive index of acrylic enters the acrylic rod member 8 and is diffused within it, so that substantially uniform light is applied to the central area of the semiconductor chip 1.

The optical module 5 and package base 2 are made of a light shielding material.

The semiconductor chip 1 and package base 2 have the structure as shown in FIG. 1B. Specifically, the semiconductor chip 1 is housed within a central recess of the package base 2. An AE sensor 17 such as a photodiode for average light measurement is formed in the chip 1 at its central area. A standard CCD 15 and reference CCD 16 are formed in the chip 1, sandwiching the AE sensor 17.

The AF lenses shown in FIG. 1A focus the image of a main subject in front of the device and away from it by a predetermined distance, onto the standard and reference CCDs 15 and 16. The acrylic rod member 8 applies incident light from the broader area than the main subject to the AE sensor 17 at the central area of the semiconductor chip 1.

As shown in FIG. 1C, an AF zone 26 is positioned at the center of a field of view 25, and an AE zone 27 is positioned at the circumferential area of the AF zone 26. Namely, the AE sensor 17 receives light within the AE zone 27, and the standard and reference CCDs 15 and 16 receive light within the AF zone 26.

It is necessary for the focusing adjustment to set the pair of AF sensors 15 and 16 spaced apart a base length (corresponding to the distance between the optical axes of the AF lenses 6 and 7). Therefore, the area of the semiconductor chip 1 corresponding to the base length becomes empty. This empty area is used to form the AE sensor 17. It is therefore possible to perform a spot light measurement by the AF sensors 15 and 16 and an average light measurement by the AE sensor 17, without increasing the size of the semiconductor chip 1.

Figure 2A:
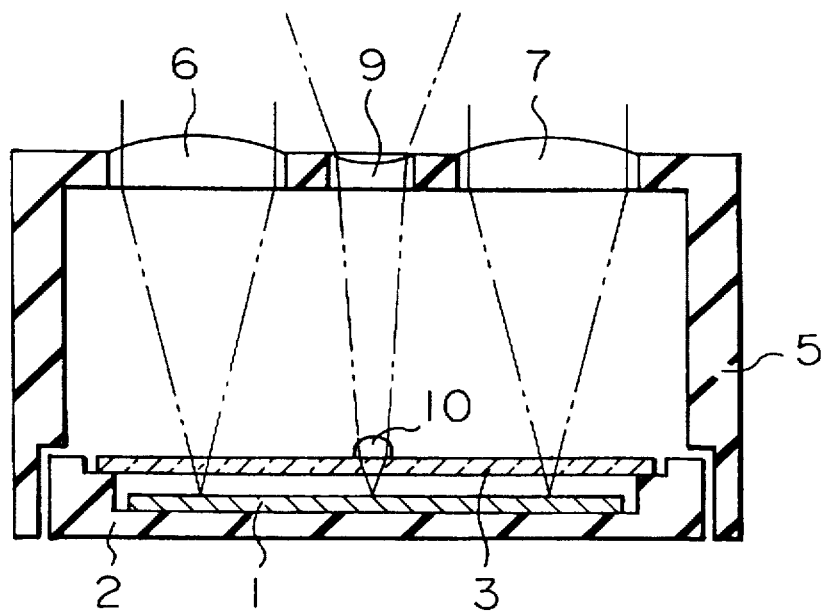
FIGS. 2A to 2C show an automatic light measuring device for an image pickup device according to another embodiment of the present invention.
Figure 2B:
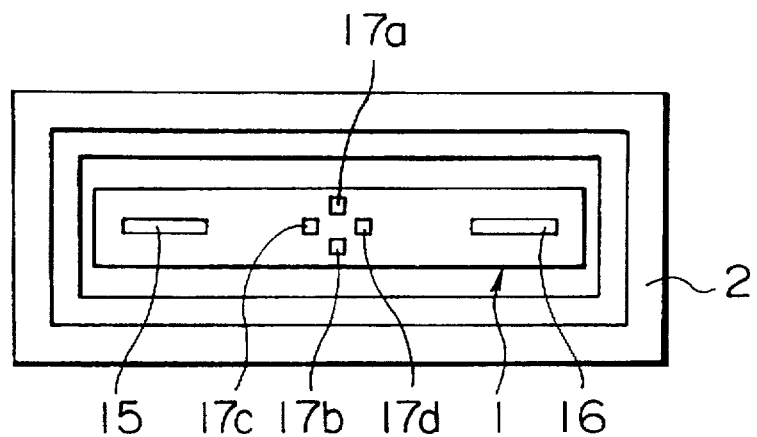
Figure 2C:
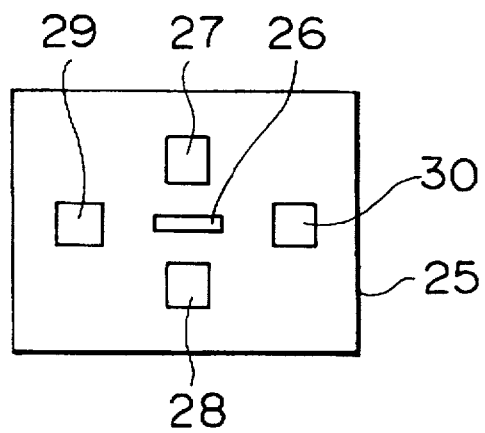

FIGS. 2A to 2C show another embodiment of an automatic light measuring device for an image pickup device according to the present invention. A semiconductor chip 1, package base 2, sealing glass 3, optical module 5, and AF lenses 6 and 7 are elements similar to those of the embodiment shown in FIGS. 1A to 1C. At the center of the optical module 5, there is mounted a concave lens 9 constituting a retrofocus lens. The other lens, convex lens 10 constituting the retrofocus lens, is mounted at the corresponding area of the sealing glass 3. By using the retrofocus lens system constituted by the concave and convex lenses 9 and 10, a subject image within a broad area of the field of view is focused on the semiconductor chip 1 at the central area thereof.

As shown in FIG. 2B, four AE sensors 17a, 17b, 17c, and 17d are formed on the semiconductor chip 1 at the central area thereof.

Specifically, an AF zone is positioned at the central area of the field of view 25 as shown in FIG. 2C, and four measuring zones corresponding to the AE sensors 17a, 17b, 17c, and 17d are positioned at the circumferential area of the AF zone 26.

In this embodiment, a divisional light measurement is performed by the AE sensors at the four zones within the field of view. The AF sensor performs an illuminance measurement at the central AF zone 26 within the field of view.

In the above description, the retrofocus lenses formed by the concave and convex lenses 9 and 10 focus the subject image within a broad area of the field of view onto the semiconductor chip 1. In place of the retrofocus lens, a SELFOC lens made of fibers having a focusing function and sold by NEC Corp. may be used. In this case, the CELFOC lens is mounted in the manner like that shown in FIG. 1A.

Figures 3A, 3B:
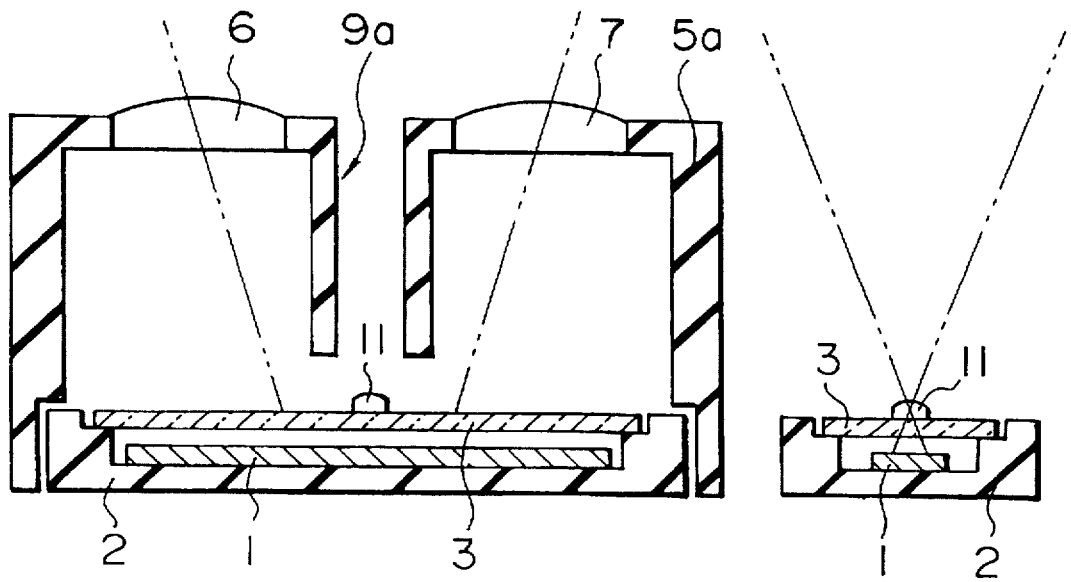
FIGS. 3A to 3D show an automatic light measuring device for an image pickup device according to another embodiment of the present invention.
Figure 3C:
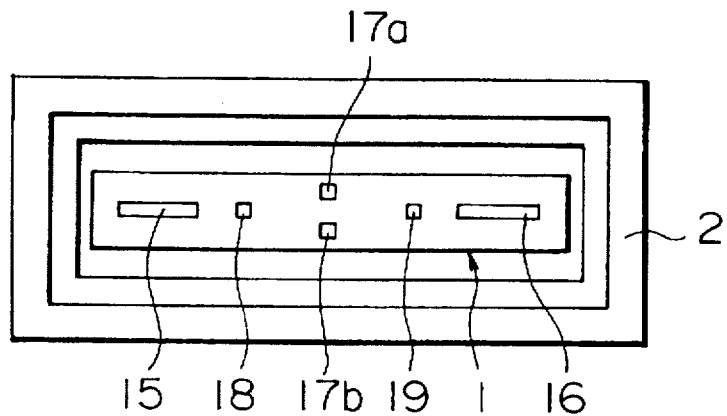

FIGS. 3A to 3C show another embodiment of an automatic light measuring device for an image pickup device according to the present invention.

As shown in FIG. 3A, a semiconductor chip 1 is housed within a package base 2 on the top surface of which there is mounted a sealing glass 3 to seal the space within the package base 2. A convex lens 11 is formed on the top surface of the sealing glass 3 at the central area thereof. An optical module 5a covers the upper surface of the package base 2. AF lenses 6 and 7 are formed in the optical module 5a at positions corresponding to opposite side areas of the semiconductor chip 1.

In this embodiment, the optical module 5a is separated into right and left members as shown in FIG. 3A, with a narrow elongated groove being formed at the central area for allowing light to pass therethrough. This central light passing groove 9a extends in the direction perpendicular to the drawing surface. Light incident to this narrow groove is focused transversely on the semiconductor chip 1 as shown in FIG. 3B. As shown in FIG. 3C, the semiconductor chip 1 has a structure similar to that shown in FIG. 2B. Specifically, four AE sensors 17a, 17b, 18, and 19 are formed on the semiconductor chip 1 at the central area thereof, and a standard CCD 15 and reference CCD 16 serving as AF sensors are formed on opposite side areas of the four AE sensors.

In this embodiment, light passed through the central light passing groove 9a of the optical module 5a is incident upon the AE sensors 17a and 17b, and light passed through the AF lenses 6 and 7 is incident upon the AE sensors 18 and 19 positioned at opposite sides of the AE sensors 17a and 17b. Namely, light passed through the AF lenses 6 and 7 is incident not only upon the AF sensors but also upon the AE sensors 18 and 19.

Figure 3D:
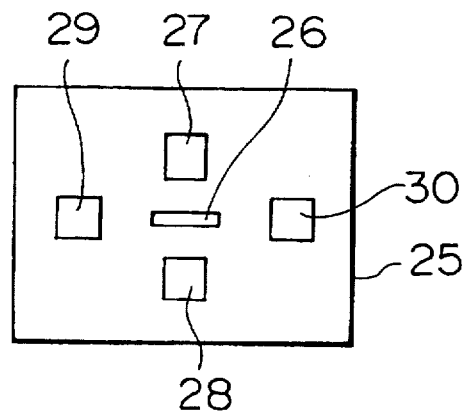

As shown in FIG. 3D, an AF zone 26 is positioned at the central area of the field of view 25, and AE zones 27, 28, 29, and 30 are positioned at the circumferential area of the AF zone 26. Of the AE zones, the zones 27 and 28 are applied with light focussed by the convex lens 11, and the zones 29 and 30 are focussed with a subject image obtained by the AF lenses 6 and 7.

It is sufficient for the exposure adjustment light measurement by the AF sensors to be performed by one of the standard CCD 15 and reference CCD 16.

Figure 4:
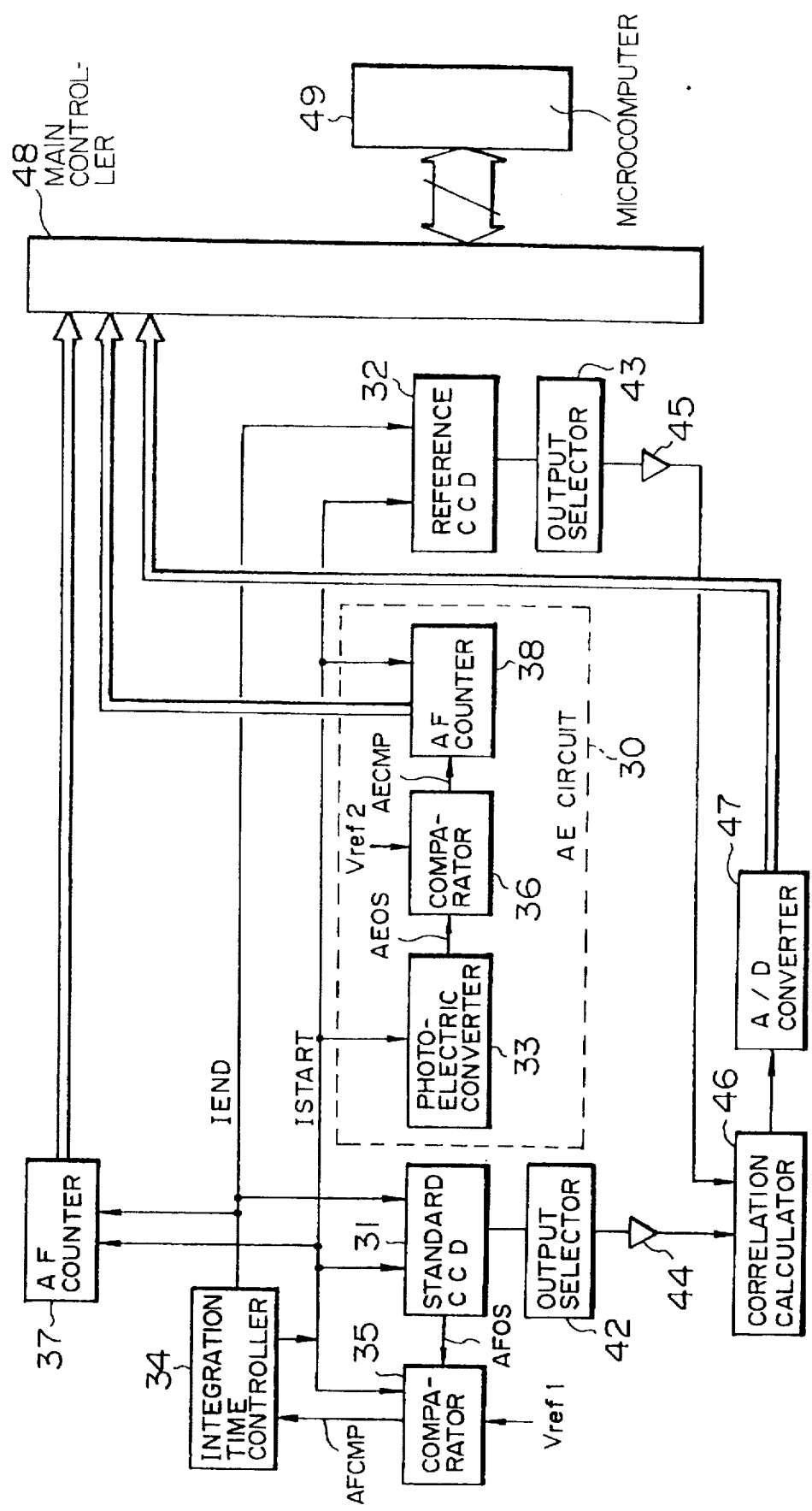
FIG. 4 is a block diagram showing an automatic light measuring circuit using one of the optical systems shown in FIGS. 1A–1C, 2A–2C, and 3A–3D.

FIG. 4 schematically shows a light measuring circuit using one of the optical systems shown in FIGS. 1A to 1C, 2A to 2C, and 3A to 3D.

An integration time controller 34 supplies an integration start signal ISTART to a comparator 35, standard CCD block 31, photoelectric converter 33, AF counter 37, AE counter 38, and reference CCD block 32. This signal ISTART initializes these circuit blocks.

Upon reception of the integration start signal ISTART, the standard CCD block 31 and reference CCD block 32 clear unnecessary charges accumulated before the reception of ISTART signal, and start integrating signal charges.

Upon reception of the integration start signal ISTART, the AF counter 37 and AE counter 38 clear the count to 0, and start counting a system clock signal (not shown).

In response to the integration start signal ISTART, the photoelectric converter 33 of an AE circuit 30 is reset to preset the level of an output signal AEOS to a predetermined value.

In response to the integration start signal ISTART, the standard CCD block 31 starts accumulating signal charges, and supplies an output AFOS corresponding to the accumulated charge amount to the comparator 35. The comparator 35 compares the output signal AFOS of the reference CCD block 31 and a reference voltage Vref1. The comparator 35 generates a proper exposure judgment signal AFCMP when the output signal AFOS of the standard CCD block 31 reaches a predetermined voltage.

This proper exposure judgment signal AFCMP is supplied to the integration time controller 34 which in turn generates an integration end signal IEND. The integration end signal IEND is supplied to the standard CCD block 31, reference CCD block 32, and AF counter 37.

Upon reception of the integration end signal IEND, the standard CCD block 31 and reference CCD block 32 terminate the integration of photoelectrically converted charges, and output each pixel output to a correlation calculator 46 via output selectors 42 and 43 and amplifiers 44 and 45.

The correlation circuit 46 performs a correlation computation of signal charges supplied from the two CCD blocks 31 and 32, and supplies the result to a main controller 48 via an A/D converter 47. The correlation computation result is a signal representing a distance to a main subject, i.e., representing an in-focus state. This AF measured signal is supplied from the main controller 48 to a microcomputer 49 to control the lens system of the image pickup device and focus the subject image on the focusing plane.

In response to the integration end signal IEND, the AF counter 37 stops counting the system clocks, and holds the count obtained at the time when the integration end signal IEND is received. This count is transferred via the main controller 48 to the microcomputer 49.

The count represents the time required for the light amount received and integrated by the standard CCD block 31 to take a predetermined value. The microcomputer 49 calculates the illuminance of the main subject within the AF zone, using a conversion table or formula stored in the microcomputer.

In the AE circuit 30, the photoelectric converter 33 accumulates electric charges having been generated by incident light after the reception of the integration start signal ISTART, and supplies an AEOS output proportional to the accumulated electric charges to a comparator 36. The comparator 36 compares the output signal AEOS of the photoelectric converter 33 and a reference voltage Vref2, and generates an exposure amount judgment signal AECMP when the output signal AEOS takes a predetermined voltage value.

The exposure amount judgment signal AECMP is supplied to the AE counter 38 to stop the count operation thereof. The AE counter 38 holds the value counted from when the integration start signal ISTART was generated to when the exposure amount judgement signal AECMP generates.

This count is sent from the AE counter 38 to the microcomputer 49 via the main controller 48. The count represents the incident light amount at the photoelectric converter 33 of the AE circuit 30. Using this count and a conversion table or formula stored in the microcomputer 49, it calculates the illuminance of the main subject at the AE zone. In the above manner, the correlation calculation circuit 46 generates a signal to be used for the focusing adjustment, the AF counter 37 supplies a signal to be used for the exposure amount adjustment at the AF zone, and the AE counter 38 supplies a signal to be used for the exposure amount adjustment at the AE zone. Then, the spot light measurement at the central area of the field of view and the incident light amount measurement at the AE zone are carried out.

In the above description, although the comparator 35 is connected to the standard CCD block, it may be connected to the reference CCD block.

Figure 5A:
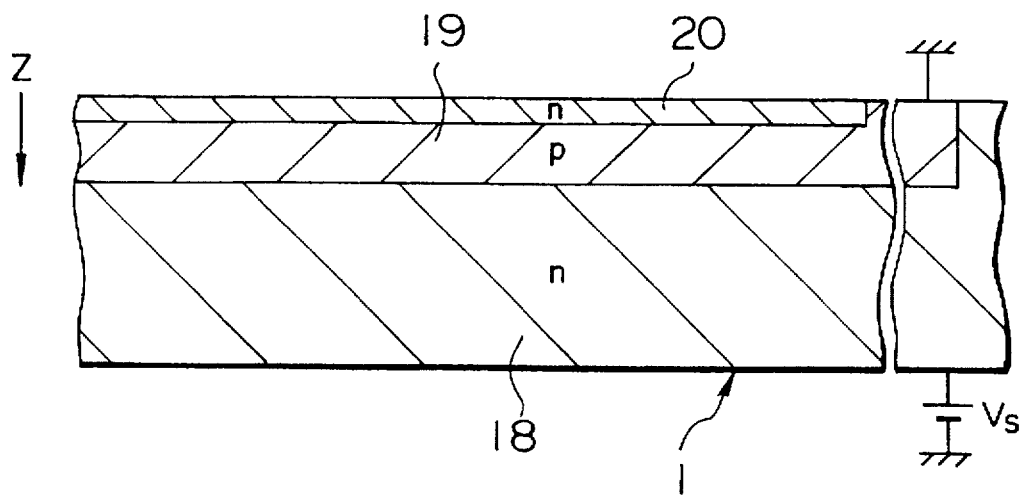
FIGS. 5A and 5B show an example of an AE sensor formed in the semiconductor chip shown in FIGS. 1A–1C, 2A–2C, and 3A–3D.
Figure 5B:
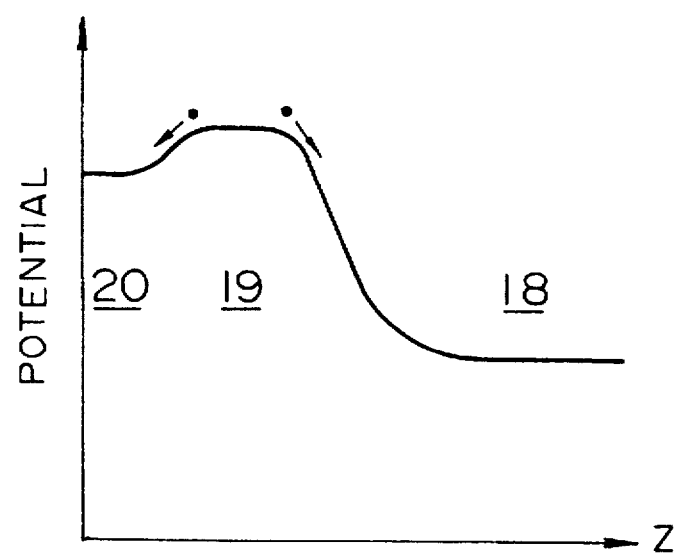

FIGS. 5A and 5B show an example of the structure of an AE sensor.

A semiconductor chip 1 has a p-well 19 formed on the surface of an n-type semiconductor substrate 18. An n-type region 20 is formed on the surface of the p-well 29. The p-well is grounded, and the n-type substrate 18 is supplied with a bias voltage+Vs. The n-type region 20 and p-well 19 form a diode, and the p-well 19 and n-type substrate 18 form another diode.

The potential distribution in the depth direction z of the semiconductor chip 1 constructed above is shown in FIG. 5B. The abscissa represents the depth Z, and the ordinate represents the potential relative to an electron. The potential of electrons is high in the p-well 19, and lowers somewhat in the n-type region 20 on the surface side of the semiconductor chip 1. The potential of electrons lowers further in the n-type substrate 18.

When light becomes incident to the semiconductor chip 1 from the top surface thereof, pairs of electrons and holes are generated within the semiconductor chip 1. Holes are collected to the p-well 19 and pulled out to the ground potential.

Electrons generated by incident light move from the p-well 19 and its depletion layers toward the lower potential n-type region 20 or n-type substrate 18. Electrons moving toward the n-type substrate are pulled out from the positive potential+Vs electrode. However, electrons moving toward the n-type region 20 are accumulated therein. Electric charges generated by incident light are accumulated in the above-described manner. If the thickness of the n-type region 20 formed on the surface of the semiconductor chip 1 is made thinner in excess of a certain degree, incident light is not sufficiently absorbed by the n-type region 20 or its peripheral region, but it goes to a deeper position. Pairs of electrons and holes generated by incident light passed through the n-type region 20 and its depletion layers contribute less to the accumulated charges in the n-type region 20.

The lower the absorption coefficient of semiconductor constituting the semiconductor chip 1 becomes, the longer the wavelength of light. Therefore, light having the longer wavelength goes deeper within the semiconductor chip 1. Accordingly, the AE sensor lowers its sensitivity for longer wavelength light.

Figure 6A:
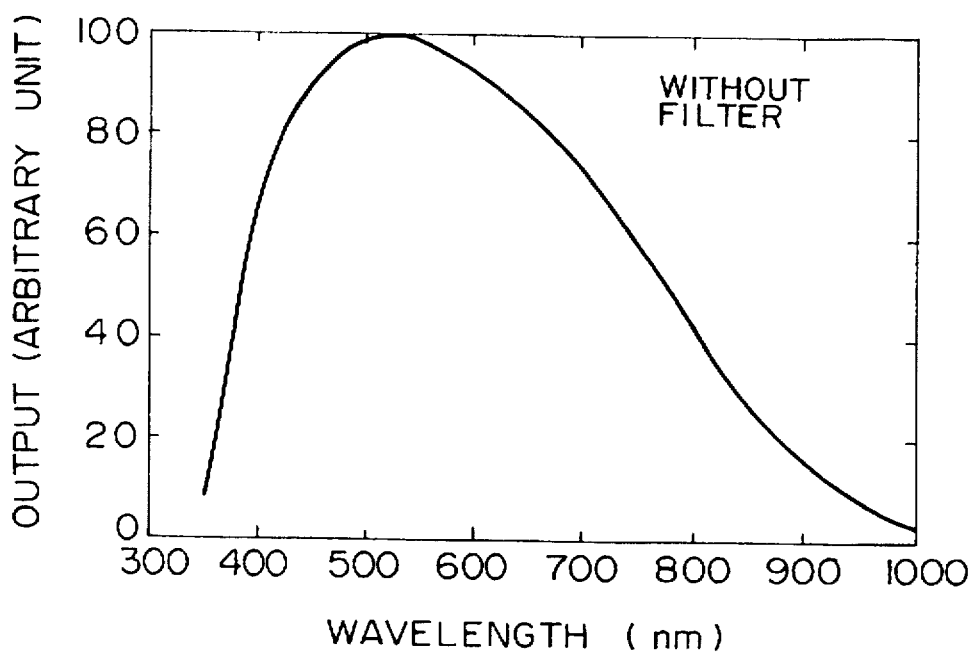
FIGS. 6A and 6B are graphs showing the characteristics of the photodiode shown in FIGS. 5A and 5B.

The characteristic of the AE sensor made of the diodes shown in FIGS. 5A and 5B becomes therefore as shown in FIG. 6A. The structure of the photodiodes is selected such that the peak sensitivity of the photodiodes is obtained at about 520 nm. In this case, the light sensitivity extends gently toward the longer wavelength side, providing a difference from the luminosity.

To compensate for the light sensitivity, an infrared cut-filter is formed on the sealing glass 3.

Figure 6B:
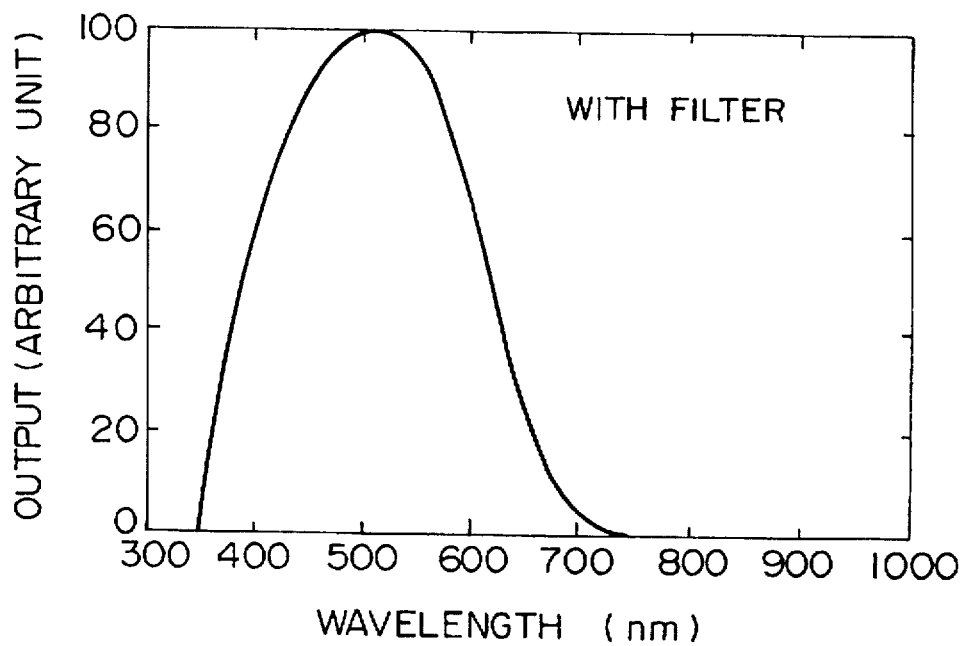

The characteristic shown in FIG. 6B shows the characteristic obtained by superposing the photodiode characteristic shown in FIG. 6A onto the infrared cut-filter characteristic. Since the infrared light characteristic is lowered by the infrared cut-filter, the composite characteristic of the photodiode and filter matches the luminosity as shown. Such an infrared cut-filter may be an infrared cut-filter cutting light equal to or longer than about 700 nm.

Figure 7A:
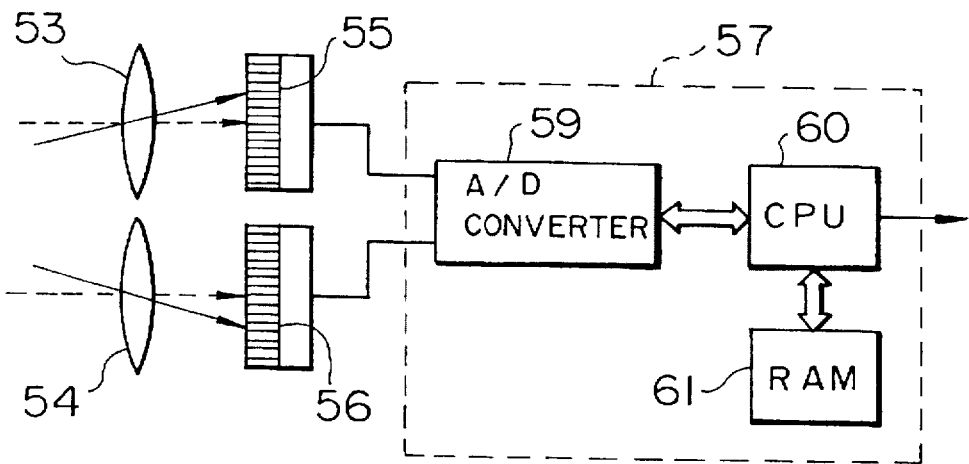
FIGS. 7A to 7C show an example of the structure of the line sensor used in the optical systems shown in FIGS. 1A–1C, 2A–2C, and 3A–3D.
Figure 7B:
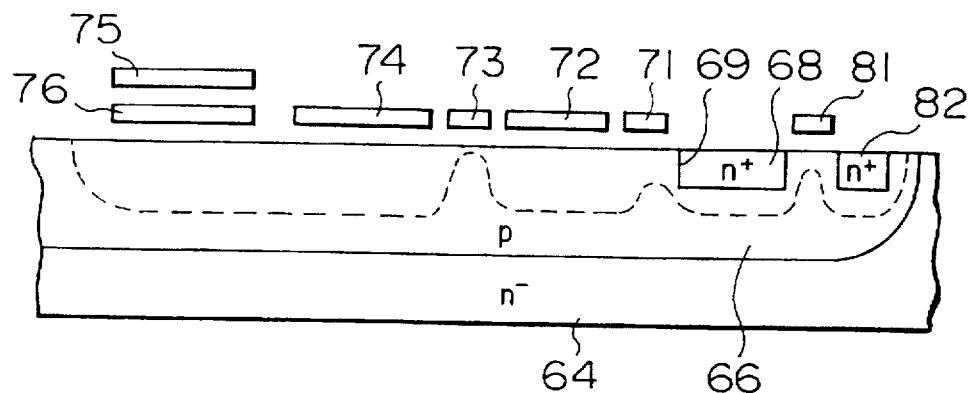
Figure 7C:
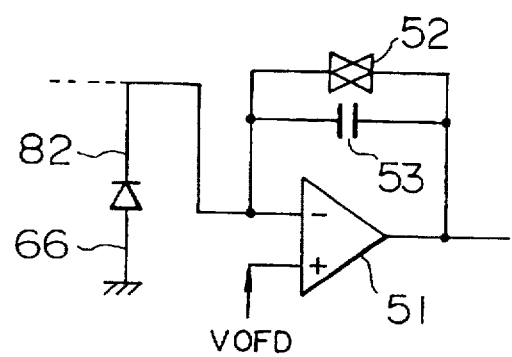

If the infrared cut-filter is formed over the whole surface of the sealing glass, the same characteristic can be obtained both for incident light to the AE sensor 17 and to AF sensors 15 and 16. Furthermore, since the AE sensor 17 and AF sensors 15 and 16 are formed on the same semiconductor chip, it is easy to obtain the same characteristic of both the AE and AF sensors. For this reason, it is possible to obtain light measuring devices with small variation of characteristics. FIGS. 7A to 7C schematically show the structure of an automatic focusing detection unit using line sensors made of a standard CCD and reference CCD. This automatic focusing detection unit determines a distance to a subject by the triangulation method using the subject angles as viewed from the two line sensors spaced apart by the base length.

FIG. 7A schematically shows an example of the structure of the system after the line sensor lenses. A standard line sensor 55 and reference line sensor 56 are mounted spaced apart by the base length, with their optical axes being aligned with those of distance measuring lenses 53 and 54.

The distance measuring lenses 53 and 54 focus the image of a subject at an infinite distance on the regions corresponding to the optical axes of the standard and reference line sensors 55 and 56. As a subject comes near to the camera, light incident from the subject to the distance measuring lenses 53 and 54 reaches the sensors at the upper and lower regions of the sensors as shown in FIG. 7A.

Namely, the more a subject comes near to the camera, images focused on the standard and reference line sensors 55 and 56 gradually move more apart from each other. By detecting the distance between the images on the standard and reference line sensors 55 and 56, it is possible to measure the distance between the camera and the subject by the triangulation method.

Specifically, an image signal B (k) is read from each pixel of the standard line sensor 55 at a fixed phase, and an image signal R (k+m) is read from the reference line sensor 56 by setting a predetermined phase difference m. If the two images are the same, B(k)−R (k+m)=0. Using n pixels of the image read region, each pair of image signals read from n pixels of the two line sensors is calculated to obtain B(k)−R(k+m) and a sum of results which indicates the correlation factor H (m). Namely, $$H(m) = \Sigma\ (k=1\ \text{to}\ n)\ B\ (k) - R\ (k+m) \quad (1)$$

where $\Sigma$ (k=1 to n) represents a sum of a function for k=1 to n. The correlation factor H (m) indicates the degree of coincidence of images on the standard and reference line sensors 55 and 56 at the phase difference m.

The phase difference m is sequentially changed to obtain each correlation factor H (m) and draw a correlation curve. The position at the minimum value of the correlation curve corresponds to the phase at which the images on the standard and reference line sensors 55 and 56 become most coincident. By detecting such a phase, it is possible to measure a distance between the camera and subject.

A signal processor 57 has an A/D converter 59 for converting a signal from the line sensors from an analog quantity to a digital quantity, a central processing unit (CPU) 60 for performing a correlation computation, and a random access memory (RAM) as a temporary storage device for storing image signals converted into digital values. CPU 60 calculates the correlation factor using the image signals stored in RAM 61 to detect the phase having the minimum correlation factor.

In the focusing detection circuit shown in FIG. 7A, electric charges accumulated in the photosensors are charge-voltage converted to obtain a detection signal which is converted into a digital signal and stored in RAM 61. This signal is then read to perform the correlation computation.

If electric charges accumulated upon application of light are non-destructively read and their analog values are used for the computation, RAM 61 can be omitted simplifying the circuit structure.

FIG. 7B shows an example of a photosensor unit to be used for such purpose. A light detection unit is realized by forming a p-type well 66 on the surface of an n⁻ type silicon substrate 64 and forming an n⁺ type region 68 within the well 66 to obtain a pn junction 69. When light is incident near the pn junction 69, pairs of electrons and holes are generated which are separated by the potential gradient near the pn junction, to thereby accumulate electrons.

Formed above the p-type well 66 on the left side of the pn junction 69 as viewed in FIG. 7B are polysilicon insulated gate electrodes 71 to 74, and 76. A barrier with the gate electrode 71 is formed adjacent the photodiode, and an accumulator with the gate electrode 72 is formed adjacent the barrier. A broken line shown in FIG. 7B indicates a depletion layer.

When electric charges generate in response to light incident to the light receiving area, the electric charges are accumulated in the accumulator via the nearby area of the pn junction 69 and barrier. The accumulator is contiguous to a shift register with the gate electrode 74 via the transfer gate electrode 74. The shift register is contiguous to the area under the floating gate electrode 76 with the bias applying aluminum electrode 75.

On the right side of the photodiode, there is formed an overflow drain 82 of an n⁺ region on the right of the overflow gate 81.

When electron/hole pairs are generated in response to incident light to the photodiode, carriers are accumulated in the accumulator under the gate electrode 72, passing over the barrier. The carriers can be transferred to the area under the shift register gate electrode 74, passing the transfer gate electrode 73.

Electric charges accumulated under the gate electrode 74 of the shift register are transferred to the area under the floating accumulating gate electrode 76 depending upon the voltage of the gate electrode 75. Electric charges corresponding to the transferred electric charges are induced to the floating gate electrode 76 so that the incident light amount is non-destructively read from the induced electric charges.

If the photosensor shown in FIG. 7B and a switched capacitor integrator are used, the calculation of the formula (1) can be executed while using analog values of electric charges.

As the incident light amount to the photodiode increases to the extent that the capacity of accumulating electric charges by the photodiode and accumulator becomes full, electric charges go over the potential barrier under the overflow gate 81 and enter the overflow drain 82. When an overflow of electric charges into the overflow drain 82 is detected, the charge accumulating operation is stopped.

An example of the circuit for detecting an overflow of the photodiode is shown in FIG. 7C. A diode formed by a p-type region 66 and n-type region 82 receives electrons overflown from the photodiode formed by the p-type region 66 and n-type region shown in FIG. 7B, and accumulates them in an n-type region 82.

The p-type region 66 and n-type regions 68 and 82 can be considered as forming diodes, and also as FET source and drain interconnected by the overflow gate 81. From this reason, the n-type region 82 has been called the overflow drain.

The overflow drain 82 is connected to an inverting input terminal of an operational amplifier 51. Connected to the non-inverting terminal of the operational amplifier 51 is a reference voltage VOFD. A parallel circuit of an analog switch 52 and capacitor 53 is connected between the output terminal and inverting input terminal of the operational amplifier 51.

Prior to starting the electric charge accumulation by the photodiode, the analog switch 52 is made conductive to set the same potential as VOFD to the inverting input terminal and output terminal of the operational amplifier 51.

Simultaneously when the charge accumulation starts, the analog switch 52 is made non-conductive. As electric charges are accumulated by the photodiode, electrons flow to the overflow drain 82 passing over the potential barrier under the overflow gate, and are stored in the capacitor 53. As the potential of the output terminal of the operational amplifier 51 changes, the voltage at the inverting terminal of the operational amplifier 51 is made the same as VOFD at the non-inverting input terminal.

As electrons are accumulated in the overflow drain 82 in this manner, the potential at the output terminal of the operational amplifier 51 changes. By detecting a potential change at the output terminal of the operational amplifier 51, it is possible to detect an overflow, or a charge accumulation state at the charge accumulating region.

When an overflow is detected, the charge accumulation operation is stopped and electric charges are transferred, for example, from the accumulator to the shift register in the structure shown in FIG. 7B, to read a signal corresponding to the accumulated charges from the floating gate.

Figure 8A:
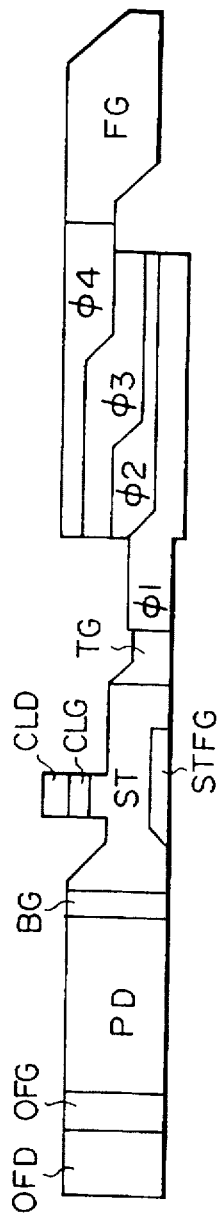
FIGS. 8A and 8B show an example of the structure of the line sensor used in the optical systems shown in FIGS. 1A-1C, 2A-2C, and 3A-3D.
Figure 8B:
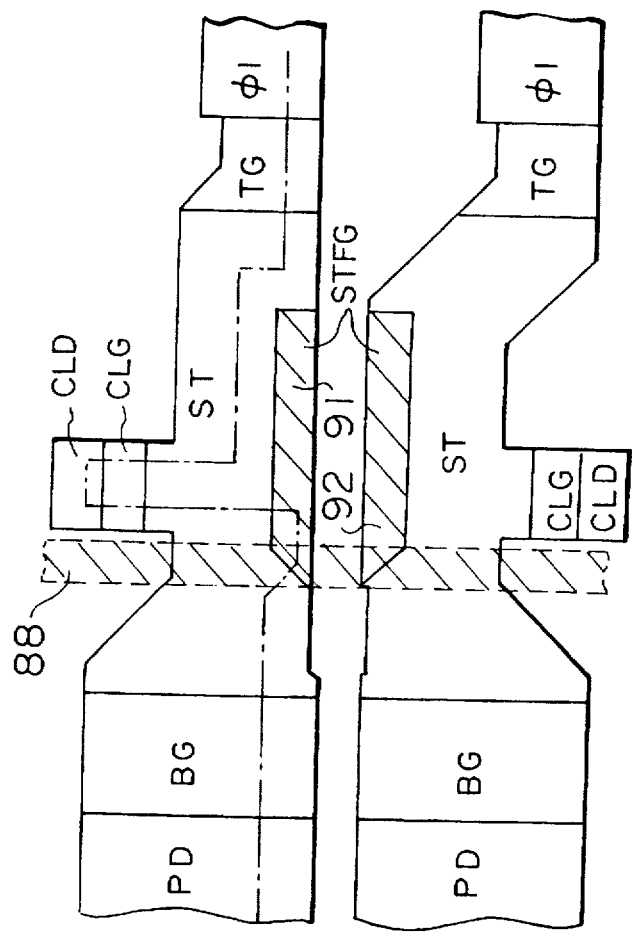

FIGS. 8A and 8B show another structure of a line sensor and its associated element formed on a semiconductor chip. FIG. 8A is a plan view of one cell, and FIG. 8B is a plan view showing the connection state of a floating accumulating gate electrode.

Referring to FIG. 8A, a photodiode PD is formed, for example, by a thin n-type region on the surface of p-type silicon. An n$^-$ type region of low impurity concentration is formed adjacent the photodiode PD. Electrodes are formed above the regions, and predetermined bias voltages are applied thereto. In this manner, a buried channel type CCD is formed. On the left side of FIG. 8A, an n$^-$ type overflow drain ODF is formed which is connected to the photodiode PD via the overflow gate OFG above an n$^-$ type region.

A barrier gate region BG forming a potential barrier is formed adjacent the photodiode PD, the region being contiguous to an accumulating region ST. Part of the accumulating region ST is connected to a clear drain region CLD via a clear gate region CLG, and via a transfer gate region TG to a CCD transfer unit.

The CCD transfer unit has four transfer stages $\phi1$, $\phi2$, $\phi3$, and $\phi4$. The CCD transfer unit is also contiguous to a floating gate region FG. The floating gate region FG is a charge read region for receiving electric charges from the stage $\phi4$ of the CCD transfer unit and reading electric charges induced to a floating gate formed above this region.

Part of the accumulating region ST is made as a floating accumulating region STFG above which the floating accumulation gate electrode is formed. The potential of the accumulating region ST can be detected by forming a capacitively coupled electrode above this region.

The accumulating region ST occupies a relatively large area. If the floating accumulation gate electrode is formed over the whole area of such a large area, the capacitance becomes large and so the operation speed is limited.

In view of this, the operation speed can be made faster if the most part of the accumulating region ST is given a fixed potential and part of the region ST is formed with the floating accumulating gate electrode STFG as shown in FIG. 8B, for the detection of the electrode potential and application of a control voltage. The floating accumulating gate electrode STFG has an area about 20% of the accumulating region.

At the initial stage of charge accumulation, electric charges are accumulated only under the narrow floating accumulating gate electrode STFG, so that the accumulated electric charge potential changes rapidly, providing a high detection sensitivity. At the final stage of charge accumulation, electric charges are accumulated in a broad region, making it hard to generate an overflow.

In detecting light, the clear gate region CLG is first made conductive to pull out electric charges under the accumulating region ST to the clear drain CLD. After setting a predetermined initial state in this manner, electric charges generated by incident light to the photodiode PD are accumulated in the accumulating region ST via the barrier gate BG.

The floating accumulating gate electrode STFG is connected in common to a number of cells. This connection is shown enlarged in FIG. 8B. Cells of the photosensor have two types, two cells constituting one unit in the layout of the photosensor.

FIG. 8B shows the connection of one unit of two cells to the floating accumulating gate electrode. Floating accumulating gates 91 and 92 are formed on the partial area of the accumulating region. These floating accumulating gate electrodes 91 and 92 are made of, for example, polysilicon.

A wiring 88 made of such as aluminum, for example, is formed extending to the vertical direction in FIG. 8B, to connect together the floating accumulating gate electrodes 91 and 92. The wiring 88 also connects together other floating accumulating gate electrodes of other cells.

The floating accumulating gate electrodes 91 and 92 formed above the partial area of the accumulating region ST are connected in parallel for a number of cells to form a single capacitor.

With the structure shown in FIGS. 8A and 8B, it is possible to non-destructively measure the incident light amount to the AF sensor.

If a plurality of AF sensors are used as shown in FIGS. 2A to 2C, and 3A to 3D, the AE circuits 30 of the measuring circuit shown in FIG. 4 are provided in parallel as many circuits as that of the AE sensors.

With such a structure, both the AF light measurement and AE light measurement can be performed at a time without increasing the chip size and with finer exposure control.

The present invention has been described in connection with the preferred embodiment. This invention is not intended to be limited to the embodiment only, but it is apparent by those skilled in the art that various changes, improvements, combinations, and the like can be made.

We claim:

1. An automatic light measuring device for an image pickup device comprising:

a pair of line sensors suitable for performing an automatic focusing adjustment, said pair of line sensors being spaced apart by a predetermined distance and mounted on a single semiconductor chip;

integration time controlling means for generating an integration control signal for controlling charge accumulation by incident light, by detecting the amount of charge accumulated on each of said line sensors;

first exposure amount detecting means for calculating the intensity of the incident light from said integration control signal;

second exposure amount detecting means inclusive of photoelectric conversion elements formed on said semiconductor chip, for detecting the amount of incident light;

a pair of lenses mounted above said pair of line sensors for focusing the image of substantially the same subject within the central area of a field of view; and an optical system for applying light within an area broader than the central area of the field of view to the surface of said semiconductor chip inclusive of said photoelectric conversion elements.

2. An automatic light measuring device for an image pickup device according to claim 1, wherein said photoelectric conversion elements are formed on said semiconductor chip between said pair of line sensors, and said optical system is mounted between said pair of lenses.

3. An automatic light measuring device for an image pickup device according to claim 1, wherein said photoelectric conversion elements include a plurality of independent areas.

4. An automatic light measuring device for an image pickup device according to claim 2, further including side photoelectric conversion elements disposed within the focusing areas of said pair of lenses on the surface of said semiconductor chip.

5. An automatic light measuring device for an image pickup device according to claim 1, wherein said optical system includes one of a transparent rod member, a retrofocus optical system, and a SELFOC lens.

6. An automatic light measuring device for an image pickup device according to claim 1, wherein said semiconductor chip includes a substrate of a first conductivity type, and said photoelectric conversion element includes a well of a second conductivity type formed on the surface of said semiconductor chip and an accumulating region of said first conductivity type formed in said well.

7. An automatic light measuring device for an image pickup device according to claim 6, further including means for connecting said well to a ground potential and means for applying a bias potential to said substrate.

8. An automatic light measuring device for an image pickup device according to claim 6, further including a charge pickup region of said first conductivity type formed adjacent said accumulating region within said well, and an insulated gate electrode formed above a well area between said charge accumulating region and said charge pickup region.

9. An automatic light measuring device for an image pickup device according to claim 8, further including an amplifier having input and output terminals connected to said charge pickup region.

10. An automatic light measuring device for an image pickup device according to claim 9, further including a parallel circuit comprising a capacitor and a switch, said circuit being connected between said input and output terminals of said amplifier.

11. An automatic light measuring device for an image pickup device according to claim 1, wherein said integration time controlling means includes a comparator connected to one of said pair of line sensors for comparing the accumulated charge potential at said one line sensor and a predetermined potential, and an integration end signal generator for generating a signal for stopping the charge accumulation of said line sensors when said comparator generates an output signal.

12. An automatic light measuring device for an image pickup device according to claim 11, wherein said first exposure amount detecting means includes a first counter for counting a charge accumulation time of said line sensors.

13. An automatic light measuring device for an image pickup device according to claim 1, wherein said second exposure amount detecting means further includes a comparator for comparing an output signal from said photoelectric conversion element and a predetermined voltage and a second counter for counting a time until said comparator generates an output signal.

14. An automatic light measuring device for an image pickup device according to claim 12, wherein said second exposure amount detecting means further includes a comparator for comparing an output signal from said photoelectric conversion element and a predetermined voltage and a second counter for counting a time until said comparator generates an output signal.

15. An automatic light measuring device for an image pickup device according to claim 14, further including an exposure control circuit responsive to an output of said first and second counters for generating a signal for controlling the exposure amount of the image pickup device.

* * * * *